United States Patent [19]

Shanok et al.

[11] Patent Number: 5,046,652

[45] Date of Patent: Sep. 10, 1991

[54] SUPPORT ASSEMBLY FOR LUGGAGE RACK, DOOR HANDLE AND THE LIKE

[75] Inventors: Victor Shanok; Jesse P. Shanok, both of New York, N.Y.; Joseph Limansky, East Brunswick, N.J.

[73] Assignee: Silvatrim Associates, South Plainfield, N.J.

[21] Appl. No.: 498,425

[22] Filed: Mar. 26, 1990

[51] Int. Cl.$^5$ .............................................. B60R 9/06
[52] U.S. Cl. .................................... 224/326; 224/309; 248/903
[58] Field of Search ............... 224/309, 324, 325, 326, 224/322; 52/718, 717, 716; 248/903; 138/172

[56] References Cited

U.S. PATENT DOCUMENTS

| | | | |
|---|---|---|---|
| 3,875,699 | 4/1975 | Lamarre | 138/172 X |
| 3,902,641 | 9/1975 | Peasley | 224/322 X |
| 4,501,386 | 2/1985 | Rasor et al. | 224/326 |
| 4,838,467 | 6/1989 | Bott et al. | 224/325 X |
| 4,899,917 | 2/1990 | Bott | 224/326 |
| 4,944,439 | 7/1990 | Bott | 224/326 |

Primary Examiner—Henry J. Recla
Assistant Examiner—Glenn T. Barrett
Attorney, Agent, or Firm—Goodman & Teitelbaum

[57] ABSTRACT

A support assembly for luggage racks, door handles and the like including an extruded one piece elongated tubular support member fabricated from a plastic material, the support member being disposed between attachment members at each end thereof for securing the support assembly to a mounting surface upon which the luggage rack, door handle and the like is mounted. An insert member can be disposed within the support member for additional strength thereof, where the insert member can be constructed in may different shapes for bearing against inner walls of the support member. In one embodiment, the support assembly is a rail member for a luggage rack, and includes the support member being disposed between end clips at each end thereof, the end clips being secured to the trunk lid of an automobile. In another embodiment, the support assembly is a door handle, where the support member is disposed between attachment members at each end thereof, the attachment members being secured to the door. Preferably, the support member is fabricated from commercially available engineering thermoplastic. The insert member, if required, is fabricated from an inexpensive different material, such as scrap or recycled material, or from any other suitable material.

21 Claims, 4 Drawing Sheets

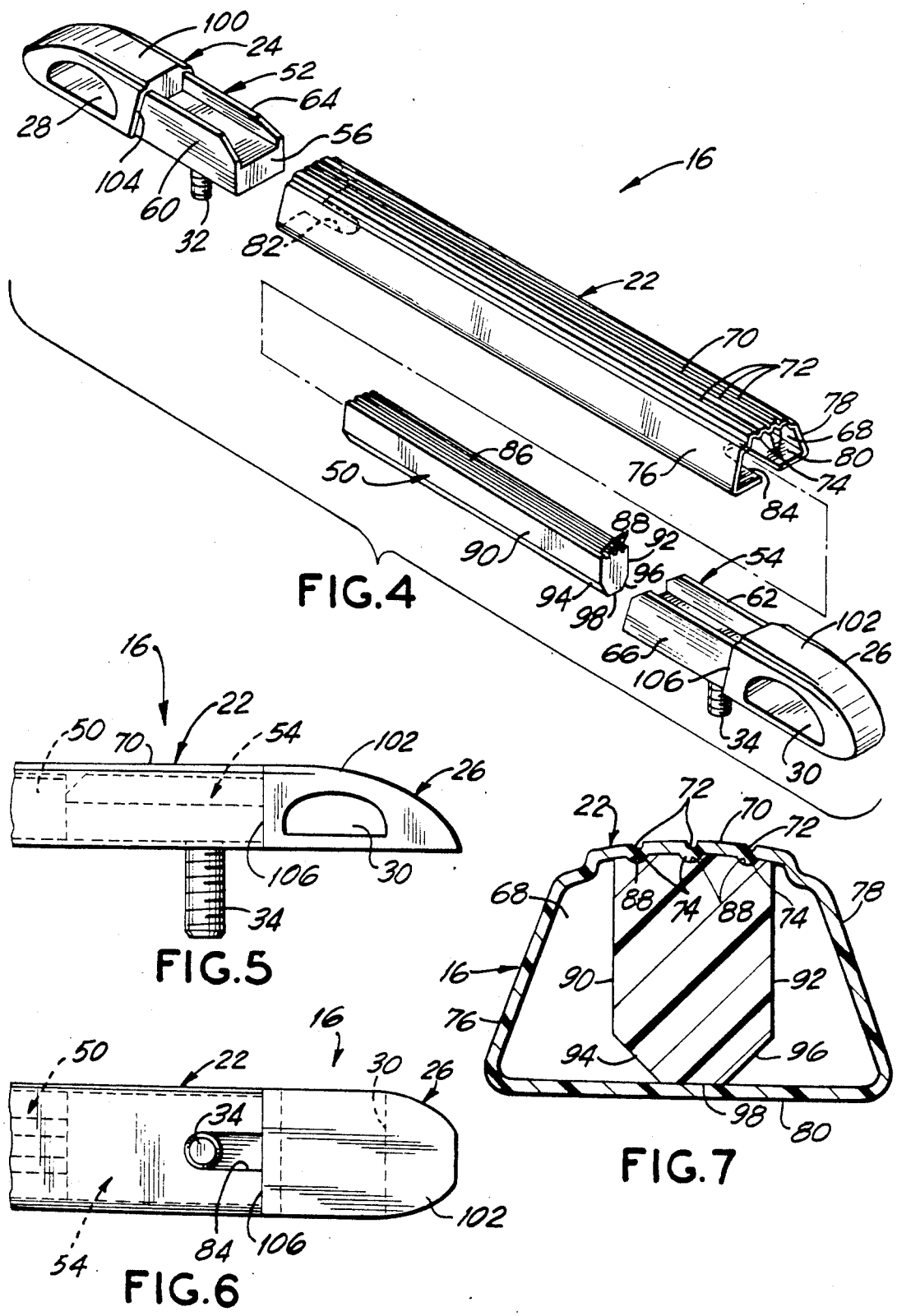

SUPPORT ASSEMBLY FOR LUGGAGE RACK, DOOR HANDLE AND THE LIKE

BACKGROUND OF THE INVENTION

This invention relates to support assemblies for luggage racks, door handles and the like and, more particularly, to a support assembly including an extruded flexible tubular support member able to withstand a significant loading or force placed on a luggage rack, door handle and the like, the support member being fabricated from a plastic-like material.

The use of support assemblies for luggage racks, door handles and the like is well known in the art. However, most of these support assemblies include metal strips, moldings, slats, channels, etc., to reinforce the support member thereof, especially when plastic parts are employed therein. For example, a few U.S. patents covering luggage racks are described below.

U.S. Pat. No. 3,856,194 discloses a luggage rack including metal strips. Each of the metal strips has a channel shape and is preferably fabricated from a metal spring material, such as stainless steel. The metal strips are secured to the roof or deck lid of an automobile by plastic fastening members which are provided at spaced points within each metal strip.

U.S. Pat. No. 4,055,285 discloses a slat for a luggage rack. The slat includes an extruded plastic base and a stainless steel molding which is snap-fitted over the base. The base insulates the roof of the automobile from the steel molding, holds the molding and cooperates with the molding to carry the weight of the luggage placed thereon.

U.S. Pat. No. 4,156,497 discloses a luggage rack including slats. The slats are fabricated from roll-formed sheet metal to provide a U-shaped configuration. Each slat is mounted on pads, and has tie-down members having a body located within the slat.

U.S. Pat. No. 4,265,383 discloses a slat assembly for automobile luggage racks including a slat and a molding pad, with each end being provided with an endcap. The slat is a metal extrusion provided with channels for receiving therein flanges of the molding pad in order to provide an interengagement therebetween. Preferably, a rub strip fabricated from rubber is received in the central channel of the slat.

Accordingly, due to the cost of the metal components of the above-mentioned support assemblies for luggage racks, door handles and the like, and the cost of manufacturing and finishing these metal components of the support assemblies, there is a need for a support assembly including a support member fabricated from a plastic material that can be extruded and has a high degree of weatherability, that has a sufficient degree of stiffness to provide high load bearing capabilities though being flexible along its longitudinal length, and which is abrasive resistant, in order to eliminate or replace the above-mentioned metal components of the support assembly.

SUMMARY OF THE INVENTION

It is accordingly an object of the present invention to provide a support assembly for luggage racks, door handles and the like which avoids the aforementioned problems of the prior art.

Another object of the present invention is to provide a support assembly that is inexpensive and has a lightweight construction.

A further object of the present invention is to provide a support assembly including a one piece elongated tubular support member.

A still further object of the present invention is to provide a support assembly including a support member fabricated from a plastic material that can be extruded and cut to desired lengths.

Still another object of the present invention is to provide a support assembly, as described above, which has a high degree of weatherability, which is abrasive resistant, and which has a sufficient degree of stiffness to provide high load bearing capabilities though being flexible along its longitudinal length.

Another object of the present invention is to provide a support assembly having a reinforcing insert member disposed within the support member to provide additional strength thereto.

Yet another object of the present invention is to provide a support assembly, as described above, in the form of rail members for a luggage rack, each rail member including a support member disposed between end clips for securing the rail member to the trunk lid of an automobile.

And yet another object of the present invention is to provide a support assembly, as disclosed above, in the form of a door handle including a support member disposed between attachment members for securing the door handle to the door.

Briefly, in accordance with the present invention, there is provided a support assembly for luggage racks, door handles and the like including an extruded one piece elongated tubular support member fabricated from a plastic material. The support member is disposed between attachment means at each end thereof for securing the support assembly to a mounting surface upon which the luggage rack, door handle and the like is mounted. An insert member can be disposed within the support member for additional strength thereof where the insert member can be constructed in many different shapes for bearing against inner walls of the support member. In one embodiment, the support assembly is a rail member for a luggage rack, and includes the support member being disposed between end clips at each end thereof. The end clips are secured to the trunk lid of an automobile. In another embodiment, the support assembly is a door handle, where the support member is disposed between attachment members at each end thereof. The attachment members are secured to the door. Preferably, the support member is fabricated from commercially available engineering thermoplastic. The insert member, if required, is fabricated from an inexpensive different material, such as scrap or recycled material, or from any other suitable material.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of preferred embodiments in which:

FIG. 4 is an exploded perspective view of the inner rail member shown in FIG. 2;

FIG. 5 is a fragmented side of an end portion of the inner rail member shown in FIG. 2;

FIG. 6 is a fragmented bottom view of the end portion of the inner rail member shown in FIG. 5;

FIG. 7 is a cross-sectional view of the support member taken substantially along line 7—7 of FIG. 2;

In the various figures of the drawings, like reference characters designate like parts.

DESCRIPTION OF THE PREFERRED EMBODIMENTS

Figure 1:
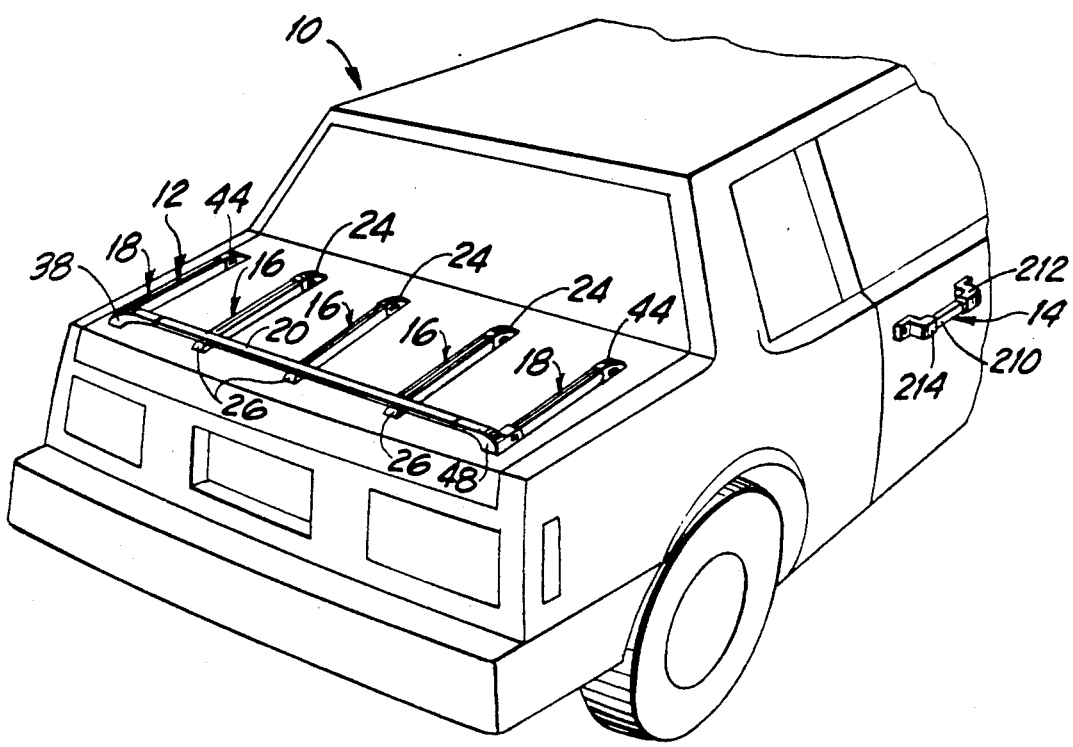
FIG. 1 is a fragmented perspective view of an automobile showing a luggage rack and door handle provided with support assemblies in accordance with the present invention.

Referring now to the drawings, FIG. 1 shows the rear end of an automobile 10 having a luggage rack 12 provided with support assemblies secured to the trunk lid of the automobile 10, and a support assembly in the form of a door handle 14 mounted on one of the doors of the automobile 10, in accordance with the present invention. The luggage rack 12 includes three inner spaced apart support assemblies or rail members 16 and two outer support assemblies or rail members 18 spaced on opposite sides of the inner rail members 16 so that the rail members 16, 18 are equally spaced apart. A raised bar 20 connects one end portion of each of the outer rail members 18 together.

Figure 2:
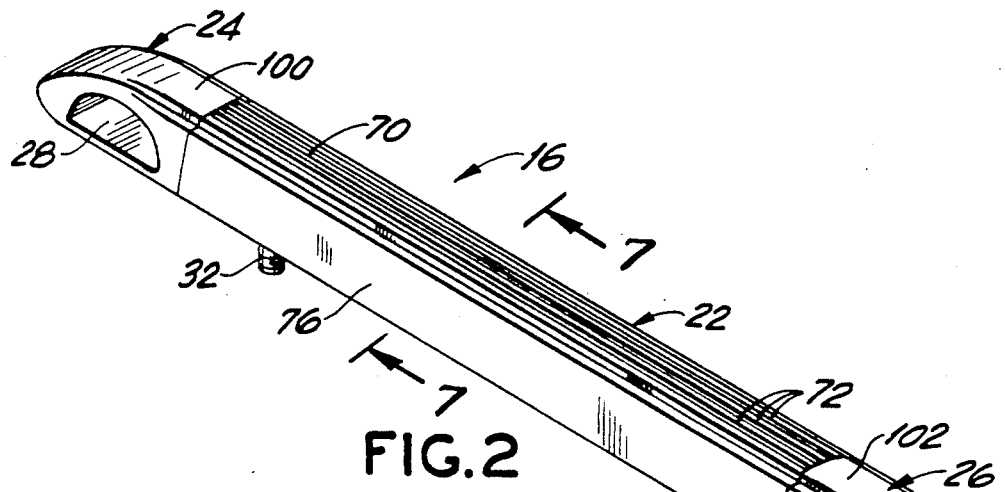
FIG. 2 is an enlarged perspective view of a support assembly in the form of one of the inner rail members of the luggage rack shown in FIG. 1.

As shown in FIG. 2, each of the inner rail members 16 includes a support member 22 having attachment means such as end clips 24, 26 at opposite ends thereof. Openings 28, 30 are provided transversely through each of the end clips 24, 26 respectively. A pair of threaded members 32 and 34 extend downwardly from the inner rail member 16, as will be discussed below.

Figure 3:
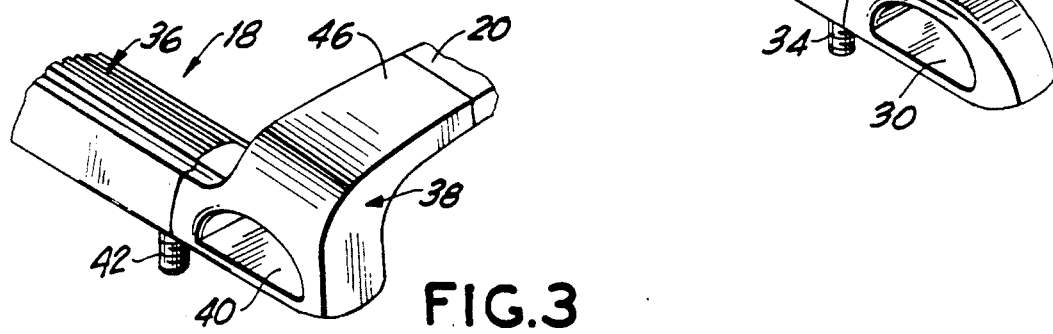
FIG. 3 is a fragmented enlarged perspective view of an outer rail member of the luggage rack shown in FIG. 1.

As shown in FIG. 3, each of the outer rail members 18 includes a support member 36 and attachment means such as an end clip 38 having an opening 40 extending transversely therethrough, and also a downwardly extending threaded member 42. The support member 36 of the outer rail member 18 has the same construction and is fabricated from the same material as the support member 22 of the rail member 16, which will be discussed in more detail below. Furthermore, attachment means such as an end clip 44 is secured in the support member 36 of the outer rail member 18 at the end opposite the end clip 38, as shown in FIG. 1. The end clip 44 is the same as the end clips 24, 26, and is secured in the support member 36 in the same manner as the end clips 24, 26 are secured in the support member 22 of the rail member 16, which also will be discussed in more detail below.

The end clip 38 of the outer rail member 18 has a raised portion 46 which is secured by conventional means to the bar 20. It is noted, that the attachment means such as the end clip 48, which is secured to the opposite end of the bar 20, as shown in FIG. 1, has a mirror image construction relative to the end clip 38, so that a detailed showing thereof, including the securement to the other outer rail member 18, is not thought necessary.

FIG. 4, shows the separate parts of the inner rail member 16 as well as including an elongated support insert member 50. The end clips 24, 26 are identical and respectively, include an insert portion 52, 54 respectively having a base 56, 58 with an upstanding flange 60, 62 on one side of the base 56, 58 and another outstanding flange 64, 66 on the opposite side of the base 56, 58. The above-mentioned threaded members 32, 34 extend downwardly from the base 56, 58, respectively, as will be explained further below.

The support member 22 is extruded from plastic, as will be discussed further below, and has a one piece elongated tubular construction to provide an opening 68 therethrough. The top wall 70 of the support member 22 has a corrugated-like construction along its longitudinal length to provide longitudinally extending grooves 72 in its outer surface and longitudinally extending projections 74 on its inner surface, as best shown in FIG. 7. It is noted, that the grooves 72 provide a non-skid outer surface on the top wall 70 of the support member 22.

The side walls 76, 78 of the support member 22 extend outwardly down from the top wall 70 to the bottom wall 80, as best shown in FIG. 7. Slots 82, 84 are provided through opposite ends of the bottom wall 80 t receive the threaded members 32, 34, respectively, therein.

The support insert member 50 is provided with a top surface 86 having longitudinal grooves 88 therein to receive the projections 74 on the inner surface of the top wall 70, as best shown in FIG. 7. Preferably, the opposing side surfaces 90, 92 of the support insert member 50 are parallel to each other over a major portion thereof, where the bottom surface portions 94, 96 thereof are tapered inwardly towards the bottom surface 98 of the support insert member 50.

In the assembly of the inner rail member 16, the support insert member 50 is inserted into the opening 68 of the support member 22 so that the support insert member 50 is fully enclosed therein, where the support insert member 50 has a shorter length than the support member 22. The engagement of the bottom surface 98 of the support insert member 50 against the bottom wall 80 of the support member 22 and the additional engagement of the projections 74 of the top wall 70 of the support member 22 in the grooves 88 in the top surface 86 of the support insert member 50 function to maintain the support insert member 50 within the support member 22.

The end clips 24, 26 are then mounted on the opposite ends of the support member 22, so that the clip insert portions 52, 54 are inserted into the opening 68 at opposite ends of the support member 22. The threaded members 32, 34 are guided into the slots 82, 84, respectively, where the bottom of the bases 56, 58 rests against the bottom wall 80 of the support member 22. Preferably, there is an interference fit between the insert portions 52, 54 of the end clips 24, 26 with the interior walls of the support member 22, so that the end clips 24, 26 are frictionally secured within the opposite ends of the support member 22 to fixedly secure the support member 22 between the end clips 24, 26. Because of the configurations of the parts, the support member 22 can not be twisted relative to the end clips 24, 26.

It is noted, that the exposed portion 100, 102 of the end clips 24, 26, which have the openings 28, 30, respectively, have an outer configuration adjacent to the insert portion 52, 54 that corresponds to the outer configuration of the support member 22, as best shown in FIGS. 2, 5 and 6, where the outer surfaces of the insert portion 52, 54 are set back to correspond to the interior walls of the support member 22, as best shown in FIG. 4. Thus, the inner walls 104, 106 of the exposed portions 100, 102 of the end clips 24, 26 act as stops which abut against the opposite ends of the support member 22 when the end clips 24, 26 are pushed into the opening 68 of the support member 22. As noted in FIGS. 5 and 6, the insert portion 54, and likewise the insert portion 52, abut against the support insert member 50 to hold the support insert member in place within the support member 22.

The assembled inner rail members 16 are now ready to be secured to the automobile trunk lid and the like. Spaced apart holes are drilled in predetermined locations through the trunk lid to receive the threaded members 32, 34 of the rail members 16. Once the threaded members 32, 34 are extended through the holes in the trunk lid, a fastening member such as a nut is threaded onto the threaded members 32, 34 to secure the inner rail members 16 on the outside mounting surface of the trunk lid, and thus the support member 22 is held in a fixed position relative to the trunk lid.

Likewise, additional holes are drilled through the trunk lid to receive the threaded members 42 of the outer rail members 18. Accordingly, the rail members 18 are assembled in the manner mentioned above with respect to the rail members 16, however, the outer rail members 18 are secured together by the bar 20 before being secured to the trunk lid. Here again, the threaded members 42 of the outer rail members 18 are inserted through the holes therefor in the trunk lid, and fastening means such as a nut is threaded thereon from inside the trunk lid to secure the outer rail members 18 and the bar 20 to the trunk lid as shown in FIG. 1.

It is noted, that due to the flexibility of the rail members 16 and 18 along the longitudinal length thereof, the rail members 16 and 18 can be longitudinally curved slightly to conform to the outer surface contour of the trunk lid. Furthermore, the plastic rail members 16, 18 will not scratch or damage the exterior surface of the trunk lid, and will not have any chemical reaction with the metal outer surface of the trunk lid. Additionally, if desired, an adhesive coating or an adhesive foam tape, which includes an acrylic and/or rubber based adhesive, may be applied to the undersurface of the rail members 16, 18 to adhere the rail members 16, 18 to the outer surface of the trunk lid.

Preferably, the end clips 24, 26, 38, 44 and 48 are die cast in one piece from a suitable metal. The support members 22, 36 are extruded in long lengths from commercially available engineering thermoplastics, such as those manufactured by General Electric under the trade name Xenoy, Geloy and the like, and then cut to the desired lengths. The engineering thermoplastics, which have strength characteristics similar to those of steel, were chosen due to the industry's requirement that the rail members 16, 18 must be able to support at least fifty pounds per linear inch without being deformed.

The support insert member 50 is provided in the support members 22, 36 of the rail members 16, 18 to insure that the rail members 16, 18 can withstand the above-mentioned fifty pounds per linear inch without deforming, however, in some cases, where the walls of the support members 22, 36 are made sufficiently thick, the support insert member 50 may not be required. The support insert member 50 is preferably fabricated from scrap or recycled material, which would obviously help the current energy program, one such plastic material being acrilonitrile butadiene styrene (ABS) plastic. Obviously, the support insert member 50 can also be fabricated from any suitable material, preferably an inexpensive material such as wood, wood chips, bonded paper, steel, sand and the like. It is further noted, that if the support insert member 50 were to be eliminated, the void could be filled with compressed air by properly sealing the openings at the opposite ends of the support members 22, 36 with a suitable sealant.

In view of the above, it is noted, that the bar 20, which is normally fabricated from metal, could also be extruded from a suitable plastic material, such as engineering thermoplastics mentioned above with respect to the support members 22, 36, and would have a one piece tubular construction. Accordingly, a support insert member, if required, can be inserted into the bar 20 to strengthen the bar 20 in the same manner a the above-mentioned insert member 50.

Figure 8:
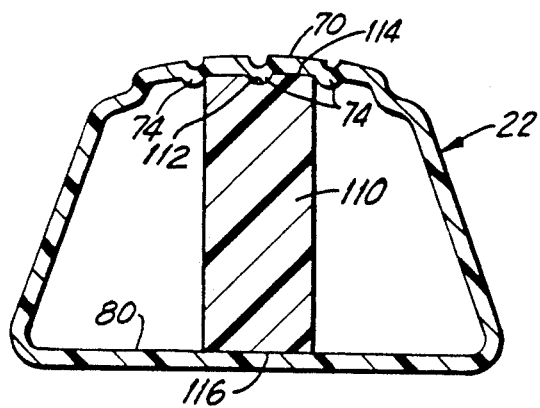
FIG. 8 is a cross-sectional view of the support member, similar to FIG. 7, showing a modified insert member therein.

FIG. 8 is similar to the cross-sectional view of FIG. 7, showing the support member 22 having a modified elongated support insert member 110. The support insert member 110 has a substantially rectangular shape with a longitudinal groove 112 in the top surface 114 of the support insert member 110 to receive the central projection 74 of the support member 22 therein. Preferably, the top surface 114 of the support insert member 110 has a predetermined width so that the top surface 114 fits snugly between the two outer projections 74 of the support member 22. In the manner mentioned above, the support insert member 110 is inserted into the opening 68 of the support member 22 so that the support insert member 110 is fully enclosed therein. The engagement of the bottom surface 116 of the support insert member 110 against the bottom wall 80 of the support member 22, the additional engagement of the central projection 74 of the top wall 70 of the support member 22 in the groove 112 in the top surface 114 of the support insert member 110, and the engagement of the outer projections 74 on both sides of the top surface 114 of the support insert member 110, all function to maintain the support insert member 110 within the support member 22. Preferably, the support insert member 110 is fabricated from scrap or recyled material, preferably ABS plastic. Obviously, the support insert member 110 can also be fabricated from any suitable material, such as mentioned above with reference to the support insert member 50.

Figure 9:
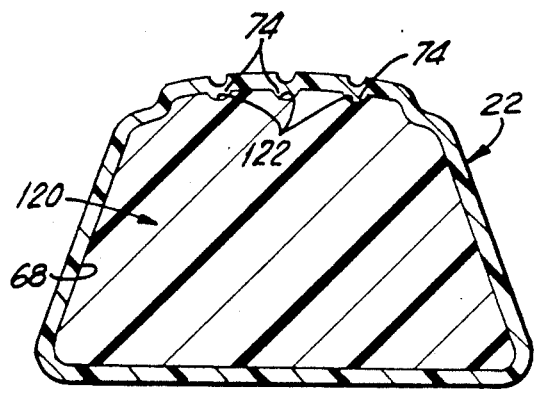
FIG. 9 is a cross-sectional view of the support member, similar to FIG. 7, showing a further modified insert member therein

FIG. 9 is also similar to the cross-sectional view of FIG. 7, showing the support member 22 having a further modified elongated support insert member 120. The support insert member 120 is contoured to have the same shape as the interior surfaces of the support member 22, there being provided a slight interference fit therebetween, so that the support insert member 120 fits snugly within the support member 22. It is noted, that the projections 74 of the support member 22 are received in the spaced-apart longitudinal grooves 122 of the support insert member 120. In a like manner as mentioned above, the support insert member 120 is inserted into the opening 68 of the support member 22 so that the support insert member 120 is fully enclosed and maintained therein. Preferably, the support insert member 120 is fabricated from scrap or recyled material, or from any other suitable material such as mentioned above, where preferably the selected material is inexpensive.

Figure 10:
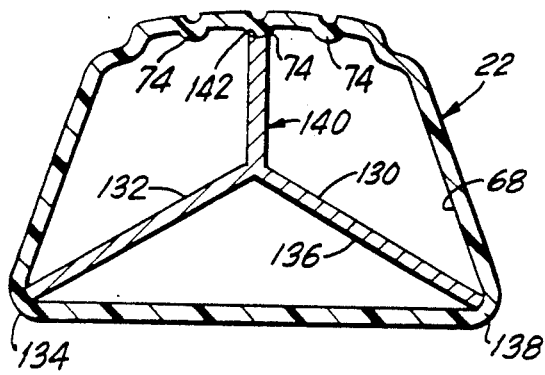
FIG. 10 is a cross-sectional view of the support member, similar to FIG. 7, showing a still further modified insert member therein.

FIG. 10 shows a cross-sectional view of the support member 22 similar to FIG. 7, however, a still further modified elongated support insert member 130 is disposed therein. The support insert member 130 has a substantially inverted Y-shaped configuration. The free end of one leg 132 of the support insert member 130 is disposed against a bottom corner portion 134 of the support member 22, and similarly a free end of another leg 136 is disposed against an opposite bottom corner portion 138. The end of the third leg 140 has a longitudinal groove 142 therein to receive the central projection 74 of the support member 22. The support insert member 130 is inserted into the opening 68 of the support member 22 so that the support insert member 130 is fully enclosed therein. Preferably, there is an interference fit between the legs 132, 136, 140 and the interior surfaces of the support member 22 so that the support insert member 130 fits snugly within the support member 22. The support insert member 130 is preferably fabricated from thin unfinished metal, such as steel, so that the cost thereof is minimal. However, under certain circumstances, the support insert member 130 can be fabricated from a suitable plastic material.

Figure 11:
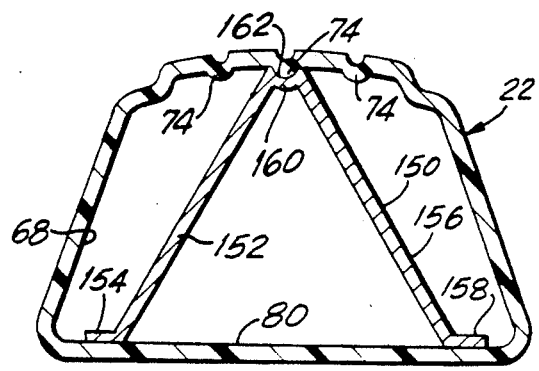
FIG. 11 is a cross-sectional view of the support member, similar to FIG. 7, showing yet another modified insert member therein.

FIG. 11 again shows a cross-sectional view of the support member 22, however, yet another modified elongated support insert member 150 is disposed therein. The support insert member 150 has a substantially inverted V-shaped configuration. The free end of one leg 152 of the support insert member 150 is provided with a flange 154 thereon which bears against the bottom wall 80 of the support member 22, and similarly a free end of the other leg 156 is also provided with a flange 158 which also bears against the bottom wall of the support member 22. The flanges 154, 158 extend in opposite directions away from each other. The bight portion 160 of the support insert member 150 has a longitudinal groove 162 to receive the central projection 74 of the support member 22 therein. The support insert member 150 is inserted into the opening 68 of the support member 22 so that the support insert member 150 is fully enclosed therein. Preferably, there is an interference fit between the legs 152, 156 and the interior surfaces of the support member 22 so that the support insert member 150 fits snugly within the support member 22. Here again, the support insert member 150 is preferably fabricated from thin unfinished metal, such as steel, so that the cost thereof is minimal. However, it is understood, that the support insert member 150 can also be fabricated from a suitable plastic material.

Figure 12:
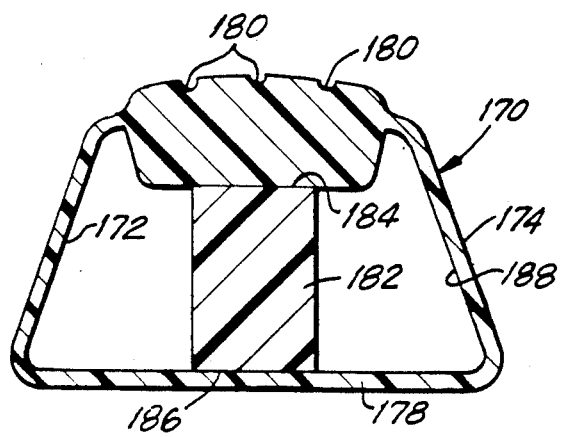
FIG. 12 is a cross-section view of another support member, similar to FIG. 7, showing a modification thereof.

FIG. 12 shows a cross-sectional view of a modified elongated support member 170 having side walls 172, 174 extending outwardly down from an enlarged top wall 176 to a bottom wall 178, where the side walls 172, 174 and bottom wall 178 are similar to the side walls 76, 78 and bottom wall 80 of the above-mentioned support member 22. The top wall 176 is enlarged in the thickness thereof and has longitudinally extending grooves 180 in its top outer surface to provide a non-skid surface on the top wall 176. The support member 170 is extruded in long lengths from commercially available engineering thermoplastics, such as mentioned above, and then cut to the desired lengths. An elongated support insert member 182, having a substantially rectangular shape, is disposed between the inner surface of the top wall 176 and the bottom wall 178 of the support member 170 in an interference fit therebetween so that the top surface 184 of the support insert member 182 bears against the top wall 176, and the bottom surface 186 of the support insert member 182 bears against the bottom wall 178 of the support member 170. In a like manner as mentioned above, the support insert member 182 is inserted into the opening 188 of the support member 170 so that the support insert member 182 is fully enclosed and maintained therein. Preferably, the support insert member 182 is fabricated from scrap or recycled material, or from any other suitable material such as mentioned above, where preferably the selected material is inexpensive.

Figure 13:
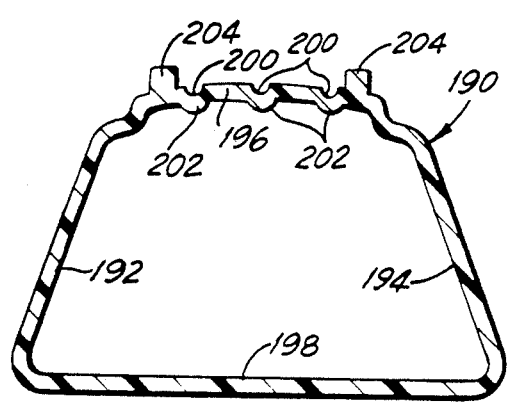
FIG. 13 is a cross-sectional view of yet another support member, similar to FIG. 7, showing a further modification thereof.

FIG. 13 shows a cross-sectional view of a modified elongated support member 190 having side walls 192, 194 extending outwardly from a top wall 196 to a bottom wall 198, where the side walls 192, 194 of the bottom wall 198 are the same as the side walls 76, 78 and the bottom wall 80 of the above-mentioned support member 22. The top wall 196 includes a corrugated-like construction to provide longitudinally extending grooves 200 in its outer surface and longitudinally extending projections 202 on its inner surface, which is similar to the top wall 70 of the support member 22. However, in addition to the grooves 200, which provide a non-skid outer surface on the top wall 196, the top wall 196 is provided with two upwardly extending abrasion strips 204, which, in addition to providing a rough non-skid surface, also function to stiffen the top wall 196. Accordingly, due to the stiffening or reinforcement of the top wall 196 provided by the abrasion strips 204, there is no need for the above-mentioned support insert member therein. The support member 190 is also extruded in long lengths from commercially available engineering thermoplastics, such as mentioned above, and then cut to the desired lengths.

Figure 14:
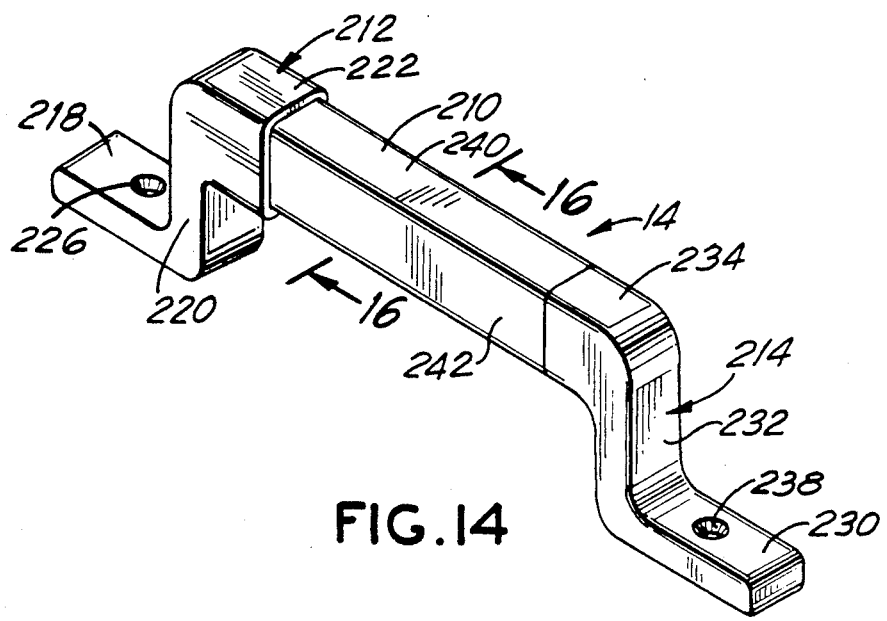
FIG. 14 is an enlarged perspective view of another support assembly in the form of the door handle illustrated in FIG. 1.
Figure 15:
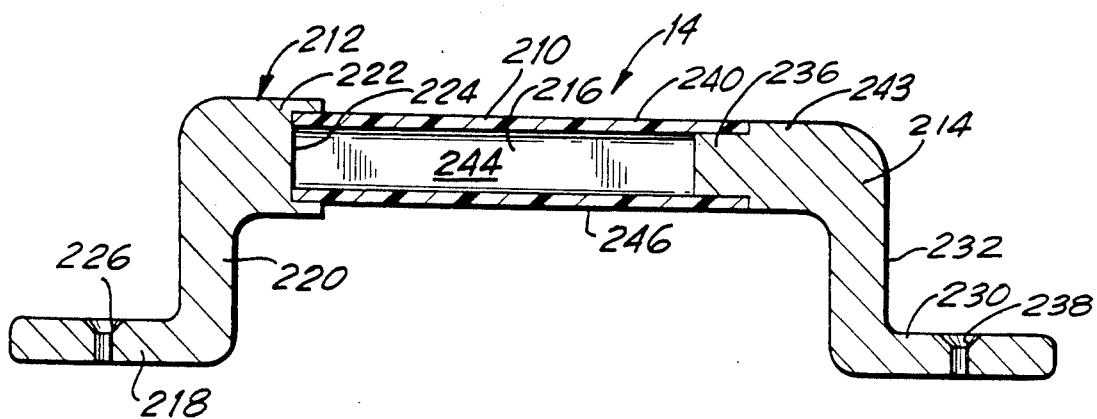
FIG. 15 is a cross-sectional view of the door handle of FIG. 14.
Figure 16:
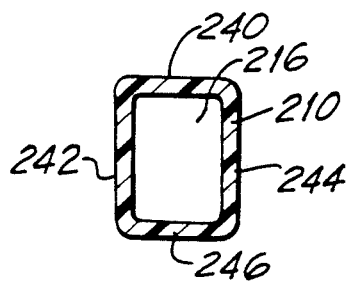
FIG. 16 is a cross-sectional view of the support member taken substantially along line 16—16 of FIG. 14.

Referring to FIGS. 14–17, the support assembly in the form of the door handle 14 will now be described. The door handle 14 includes an elongated support member 210 disposed between a first attachment member 212 at one end thereof and a second attachment member 214 at the opposite end thereof, as shown in FIGS. 14 and 15. The support member 210 is extruded from plastic, preferably commercially available engineering thermoplastic such as mentioned above, and has a one piece tubular rectangular construction to provide a top wall 240, side walls 242, 244, a bottom wall 246 and an opening 216 therethrough, as best shown in FIGS. 15 and 16, where obviously top, side and bottom walls are relative terms depending upon how the door handle 14 is mounted. Accordingly, the support member 210 is extruded in long lengths, and then cut to the desired lengths as predetermined by the locations of the attachment members 212, 214.

The attachment member 212 preferably has an off-set configuration including a horizontal base portion 218, a vertical intermediate portion 220 at right angles to the base portion 218, and a horizontal rectangular-shaped engagement portion 222 at right angles to the intermediate portion 220 and extending in an inward direction away from the base portion 218. The engagement portion 222 has a rectangular-shaped recess or seat 224 provided in the free end thereof to receive an end of the support member 210 therein, as shown in FIG. 15. Preferably, there is an interference fit between the recess or seat 224 and the end of the support member 210 so that the attachment member 212 and the support member 210 are secured together in a frictional fit. A chamfered hole 226 is provided through the base portion 218 to receive fastening means, such as a screw, to secure the attachment member 212 to the door of the automobile 10 and the like. Preferably, the attachment member 212 is fabricated from a suitable metal material as a die cast, but in some cases, can also be fabricated from a suitable plastic material.

The attachment member 214 preferably has an off-set configuration including a horizontal base portion 230, a vertical intermediate portion 232 at right angles to the base portion 218, and a horizontal rectangular-shaped engagement portion 234 at right angles to the intermediate portion 232 and extending in an inward direction away from the base portion 230. The engagement portion 234 has a rectangular-shaped reduced portion 236 at the free end thereof to mate with and be received in the opposite end of the support member 210, as shown in FIG. 15. Preferably, there is an interference fit between the reduced portion 236 and the interior of the opposite end of the support member 210 so that the attachment member 214 and the support member 210 are secured together in a frictional fit. Here again, a chamfered hole 238 is provided through the base portion 230 to receive fastening means, such as a screw, to secure the attachment member 230 to the door of the automobile 10 and the like. Preferably, the attachment member 214 is also fabricated from a suitable metal material as a die cast, but in some cases, can also be fabricated from a suitable plastic material.

As shown above, the attachment members 212, 214 fixedly secure the support member 210 therebetween, where because of the rectangular construction of the parts, the support member 210 cannot be twisted relative to the attachment members 212, 214. The assembled door handle 14 is now ready to be secured to the door of the automobile 10. Spaced apart holes are drilled in predetermined locations through the automobile door, and the holes 226, 238 of the attachment members 212, 214 are placed in alignment of these door holes. Fastening means, such as screws, are inserted through the holes 226, 238 and through the respective holes in the automobile door, and threaded nuts and the like are threaded onto the screws from inside the automobile door to secure the attachment members 212, 214 on the outside mounting surface of the automobile door s that the support member 210 is held in a fixed position relative to the automobile door.

Figure 17:
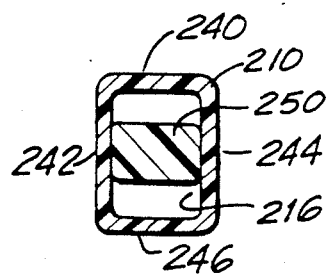
FIG. 17 is a cross-sectional view of the support member, similar to FIG. 16, showing a modification thereof to include an insert member therein.

In some cases, it may be necessary to reinforce the support member 210. Accordingly, as shown in FIG. 17, an elongated support insert member 250 is inserted into the opening 216 of the support member 210 in an interference fit therewith to provide a frictional engagement therebetween, in the same manner as mentioned above. The support insert member 250, having a substantially rectangular shape, is shown to bear against the side walls 242, 244. However, if required, the support insert member could be modified to bear against the top wall 240 and the bottom wall 246 or, in the alternative, anyone of the above mentioned support insert members could be modified for insertion into the support member 210. The support insert member 250 has a shorter length than the support member 210, which is obvious from the showing in FIG. 15. Preferably, the support insert member 250 is fabricated from scrap or recycled material, such as ABS plastic, or from any other suitable material such as mentioned above, where preferably the selected material is inexpensive.

Though the door handle 14 is shown as being used on an automobile door, such a door handle can also be used on various appliances or even used as a handle on a pull/push cart. The handle length of the door handle can obviously be varied by changing the space between and the location of the attachment members, and cutting the support member to the required length. The lightweight construction of the door handle is advantageous, especially in the automobile industry where weight is an important factor.

Numerous alterations of the structures herein disclosed will suggest themselves to those skilled in the art. However, it is understood that the present disclosure relates to preferred embodiments of the invention which are for purposes of illustration only, and are not to be construed as a limitation of the invention.

What is claimed is:

1. A support assembly for a luggage rack, said support assembly comprising:
   an extruded one piece elongated tubular support member having a top wall, side walls and a bottom wall providing a longitudinally extending opening therethrough;
   said support member being fabricated from a plastic material;
   reinforcement means provided within said support member to provide additional strength thereto, said reinforcement means being an elongated insert member;
   said insert member bearing against inner surfaces of said top and bottom walls of said support member;
   said top wall of said support member having a corrugated-like construction to provide longitudinally extending grooves in an outer surface of said top wall and longitudinally extending projections on said inner surface of said top wall;
   first attachment means for engaging one end of said support member, said first attachment means being secured to a mounting surface upon which the luggage rack is mounted;
   second attachment means for engaging an opposite end of said support member, said second attachment means also being secured to the mounting surface; and
   said first and second attachment means fixedly securing said support member therebetween so that said support member is held in a fixed position relative to the mounting surface.

2. A support assembly according to claim 1, wherein said support member is fabricated from an engineering thermoplastic material.

3. A support assembly according to claim 1, wherein said insert member is fabricated from an inexpensive different material than said support member.

4. A support assembly according to claim 1, wherein said insert member bears against inner surfaces of said side walls of said support member.

5. A support assembly according to claim 1, wherein said insert member has longitudinal groove means in a top surface thereof for receiving therein at least one of said projections of said top wall.

6. A support assembly according to claim 5, wherein said insert member partially fills a cross-sectional area of said opening extending through said support member.

7. A support assembly according to claim 5, wherein said insert member completely fills a cross-sectional area of said opening extending through said support member.

8. A support assembly according to claim 1, wherein said insert member has a substantially inverted Y-shaped configuration, free ends of two legs of said insert member being disposed against opposite bottom corner portions of said support member respectively, a free end of a third leg of said insert member being disposed against said top wall of said support member.

9. A support assembly according to claim 8, wherein said free end of said third leg of said insert member has a longitudinal groove therein receiving one of said longitudinal projection provided on said inner surface of said top wall of said support member.

10. A support assembly according to claim 1, wherein said insert member has two legs providing a substantially inverted V-shaped configuration, free ends of said two legs being disposed against said bottom wall of said support member, a bight portion of said insert member being disposed against said top wall of said support member.

11. A support assembly according to claim 10, wherein said bight portion of said insert member has a longitudinal groove therein to receive one of said projections provided on said inner surface of said top wall of said support member.

12. A support assembly for a luggage rack, said support assembly comprising:

an extruded one piece elongated tubular support member having a top wall, side walls and a bottom wall providing a longitudinally extending opening therethrough;

said support member being fabricated from a plastic material;

said top wall of said support member having a corrugated-like construction to provide longitudinally extending grooves in an outer surface of said top wall and longitudinally extending projections on an inner surface of said top wall;

first attachment means for engaging one end of said support member, said first attachment means being secured to a mounting surface upon which the luggage rack is mounted;

second attachment means for engaging an opposite end of said support member, said second attachment means also being secured to the mounting surface; and said first and second attachment means fixedly securing said support member therebetween so that said support member is held in a fixed position relative to the mounting surface.

13. A support assembly according to claim 12, wherein two upwardly extending abrasion strips are disposed along opposite longitudinal sides of said top wall of said support member with said grooves being disposed between said abrasion strips.

14. A support assembly according to claim 12, wherein at least a portion of said first attachment means is disposed within one end of said opening of said support member in an interference fit therewith.

15. A support assembly according to claim 14, wherein at least a portion of said second attachment means is disposed within an opposite end of said opening of said support member in an interference fit therewith.

16. A support assembly according to claim 12, wherein said support assembly is a rail member of a luggage rack, said first and second attachment means being identical first and second end clips.

17. A support assembly according to claim 12, wherein an elongated insert member is provided within said support member for reinforcing said support member.

18. A support assembly according to claim 17, wherein said insert member is fabricated from an inexpensive different material than said support member.

19. A support assembly according to claim 17, wherein said insert member bears against inner surfaces of said side walls of said support member.

20. A support assembly according to claim 17, wherein said insert member bears against inner surfaces of said top and bottom walls of said support member.

21. A support assembly according to claim 12, wherein said support member is fabricated from an engineering thermoplastic material.

* * * * *